Patented Apr. 5, 1932

1,852,245

UNITED STATES PATENT OFFICE

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE

METHOD OF REFINING ROSIN

No Drawing.      Application filed November 14, 1929.   Serial No. 407,276.

My invention relates to a method of refining rosin, more particularly by the partial removal of color bodies therefrom, though rosin refined in accordance with my invention will be of reduced gasoline insoluble content.

As is well known, rosin, such as gum rosin, obtained by tapping live pine trees, and wood rosin, usually obtained by extracting pine stumps or downwood with a solvent, contain color bodies which give the rosin an objectionable color, especially when the rosin is to be used in products where lightness of color is desirable or essential.

Heretofore various methods have been used for effecting the removal from rosin of color bodies and various methods have proved successful in effecting the removal of color bodies.

Now, it is the object of my invention to provide a method for the refining of rosin by the removal of color bodies therefrom which will be effective and at the same time readily and economically carried out, without the use of any special form of apparatus and with materials which may be readily obtained.

Now, in accordance with my invention, I subject wood or gum rosin to treatment with a suitable polyhydric alcohol, as one having a capacity for selectively dissolving color bodies contained in rosin, such as a suitable trihydric alcohol, as for example, either glycerin or butyl glycerol, or a suitable dihydric alcohol, as ethylene, propylene, butylene, diethylene, trimethylene, etc. glycols, either of which, or mixtures thereof, may be used in carrying out my method. Further, the polyhydric alcohol may desirably be of such a character that it will dissolve rosin either normally, or, for example, when heated and of such a character that dissolved rosin may be crystallized therefrom.

In accordance with my invention I may subject wood or gum rosin to treatment, in solid or relatively solid form, especially where the treatment is with a glycol, since either wood or gum rosin may be dissolved in glycols, at a temperature (say) within about the range of 75° C.–150° C. and then separated therefrom by suitably reducing the temperature of the solution to (say), for example, within about the range 20° C.–100° C. On separation of the rosin from the solution, color bodies of the rosin, to a material degree, will remain in solution in the glycol due to the greater solvent power of the glycol for color bodies than for abietic acid which is insoluble in glycol at 20° C.

On the other hand, when using glycerol, and also when using a glycol, wood or gum rosin may be subjected to treatment in solution in a suitable solvent therefor, which has a capacity for substantial immiscibility with glycerol or glycol in liquid phase by which I mean a solvent which is normally substantially immiscible or which may be rendered substantially immiscible with glycerol or glycol, as for example, by temperature control.

In the treatment of rosin in solution in a suitable solvent, such, for example, as gasoline, petroleum ether, or other suitable petroleum hydrocarbon, pinene, turpentine, or the like, the rosin solution is washed with glycerol or glycol, as by agitating a quantity of glycerol or glycol with a quantity of rosin solution in order to obtain contact between the rosin and the glycerol or glycol and permit the glycerol or glycol to dissolve color bodies from the rosin in solution.

After the rosin solution has been desirably washed, the glycercol or glycol, with color bodies dissolved therein, and the rosin solvent, with rosin dissolved therein, are separated, for example, by gravity, and a refined rosin, or rosin of improved quality, is recovered from the rosin solution in any convenient manner, as for example, by distilling off the solvent. If desired, the rosin so treated may be re-washed with glycerol or glycol for further refinement. The washing of the rosin solution with glycerin or glycol and the separation may be carried out at any suitable temperature, say a temperature within about the range $-15°$ C.–$+100°$ C., or, for illustration, at, for example, a temperature of about 25° C.

As illustrative of the practical adaptation of my invention, for example, 60 parts of FF wood rosin are heated with 300 parts of ethylene glycol, then cooled to about 25° C. and the glycol solution separated from the rosin. The rosin recovered, about 54 g., will be lighter in color than the original and will have a gasoline insoluble content of 2.0% as compared to 6.7% in the original rosin. Glycerol may also be used to refine the rosin in a similar manner, heating to about 150° C. and then separating the glycerol solution either at the heating temperature or at a lower temperature. Similar treatment with glycerol will yield 51 parts of rosin, M. P. 82°, having a gasoline soluble content of 3.0%.

As a further illustration, 300 grams of a solution of rosin in gasoline, or other suitable solvent, containing (say) about 14% rosin, and which may be the drop liquor obtained on the extraction with gasoline, or other suitable solvent, of pine wood from which turpentine and pine oil have been removed by steam distillation, are washed with 50 grams of a suitable glycol, as ethylene glycol. After washing, the glycol is separated from the rosin solution and a rosin of improved color is obtained, by, for example, evaporating off the rosin solvent. Desirably the treatment is carried on at a temperature of about 25° C. If desired, the rosin solution may be re-washed with further quantities of glycol and it may be noted that when a solution of a grade F+ rosin is washed four times with the glycol, a grade G+ rosin will be obtained in around 90% yield. The gasoline insoluble content of the rosin will be reduced from about 0.4% to around 0.1%.

As a further illustration, for example, 300 grams of a solution of rosin in gasoline, containing about 14% grade F+ wood rosin, is washed three times with 75 gram portions of glycerin. The rosin recovered from the washed rosin solution will be grade G in color. Again, 400 grams of a 14% solution of grade I wood rosin in gasoline will give about a 97% yield of a K—M grade rosin after being washed five times with 25 gram portions of ethylene glycol.

Further, 400 grams of a gasoline solution of I grade rosin (14% rosin) may be given two 25 gram diethylene glycol washes at 25° C. with subsequent separation of the glycol solution from the gasoline solution. The separated gasoline solution will yield 54 parts of N grade rosin.

The rosin prior to treatment in accordance with the method of my invention may be given a preliminary refining, as by washing it in gasoline solution with furfural, phenol or other selective color body solvent, previous to washing it with a glycol and, if desired, the order may be reversed and the rosin refined as with a selective solvent after treatment with a glycol.

The rosin treated in accordance with my invention will be found to be improved in color, available for a wider range of uses and hence of increased value, and will have a reduced content of gasoline insolubles and hence more available for use in soaps, core oils, limed varnishes, etc.

It will be understood that for the carrying out of my invention no special apparatus is required and that from the broad standpoint my invention involves the treatment of rosin for the refinement thereof by the removal of color bodies therefrom.

It will be understood further that in the practical adaptation of the method in accordance with my invention glycols and glycerin are substantial equivalents and that where in the claims appended hereto I specify glycol I intend specifically to include glycerin as an equivalent and it will be understood that I contemplate the term gylcol to include polyglycols and the term gylcerin to include polyglycerols.

What I claim and desire to protect by Letter Patent is:

1. The method of refining rosin which includes subjecting rosin to treatment with an aliphatic polyhydric alcohol having a capacity for selectively dissolving color bodies in the rosin for the extraction of color bodies from the rosin.

2. The method of refining rosin which includes subjecting rosin to treatment with an aliphatic polyhydric alcohol having a capacity for selectively dissolving color bodies in the rosin for the extraction of color bodies from the rosin, the rosin being subjected to treatment in solution in a solvent having the capacity for immiscibility with the polyhydric alcohol.

3. The method of refining rosin which includes subjecting rosin to treatment with a glycol having a capacity for selectively dissolving color bodies in the rosin for the extraction of color bodies from the rosin.

4. The method of refining rosin which includes subjecting rosin to treatment with a glycol having a capacity for selectively dissolving color bodies in the rosin for the extraction of color bodies from the rosin, the rosin being subjected to treatment in solution in a solvent having the capacity for immiscibility with the glycol.

5. The method of refining rosin which includes adding a glycol to a solution of rosin in a solvent therefor which has a capacity for substantial immiscibility with the glycol, separating glycol from the rosin solution and separating refined rosin from the rosin solution.

6. The method of refining rosin which includes subjecting rosin in solution in gasoline to treatment with a polyhydric alcohol having a capacity for selectively dissolving color bodies in the rosin for the extraction of color bodies from the rosin.

7. The method of refining rosin which includes subjecting rosin in solution in gasoline to treatment with a glycol for the extraction of color bodies from the rosin.

8. The method of refining rosin which includes washing a solution of rosin in gasoline with a glycol, separating glycol from the rosin solution and separating refined rosin from the rosin solution.

9. The method of refining rosin which includes adding a glycol to a solution of rosin in a solvent therefor having a capacity for substantial immiscibility with the glycol, and separating the glycol from the rosin solution at a temperature within about the range $-15°$ C. to $+100°$ C.

10. The method of refining rosin which includes adding ethylene glycol to a solution of rosin in a solvent therefor having a capacity for substantial immiscibility with ethylene glycol, separating glycol from the rosin solution and separating refined rosin from the rosin solution.

11. The method of refining rosin which includes adding a glycol to a solution of rosin in a solvent therefor having a capacity for substantial immiscibility with the glycol, separating glycol from the rosin solution, while maintaining the rosin solution and glycol at a temperature of about $25°$ C., and separating refined rosin from the rosin solution.

12. The method of refining rosin which includes subjecting rosin to treatment with ethylene glycol for the extraction of color bodies from the rosin.

13. The method of refining rosin which includes adding ethylene glycol to a solution of rosin in a solvent therefor which has a capacity for substantial immiscibility with ethylene glycol, separating ethylene glycol from the rosin solution and separating refined rosin from the rosin solution.

14. The method of refining rosin which includes subjecting rosin in solution in gasoline to treatment with ethylene glycol for the extraction of color bodies from the rosin.

In testimony of which invention, I have hereunto set my hand, at Kenvil, N. J., on this 9th day of November, 1929.

IRVIN W. HUMPHREY.